Figures 1, 2:
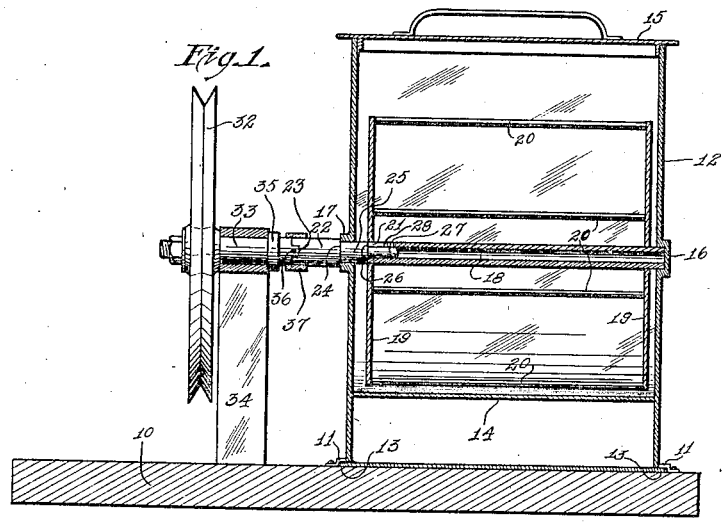

June 5, 1923.

C. ELIOPULOS

CREAM WHIPPER

Filed Sept. 7, 1921

1,457,622

Inventor
Christ. Eliopulos
by Ewing & Hague, Attys.

Patented June 5, 1923.

1,457,622

UNITED STATES PATENT OFFICE.

CHRIST ELIOPULOS, OF MARION, INDIANA.

CREAM WHIPPER.

Application filed September 7, 1921. Serial No. 499,004.

*To all whom it may concern:*

Be it known that I, CHRIST ELIOPULOS, a citizen of the United States, and resident of Marion, in the county of Grant and State of Indiana, have invented a certain new and useful Cream Whipper, of which the following is a specification.

The object of my invention is to provide a cream whipper of simple, durable and inexpensive construction, especially designed for use at soda fountains, hotels and the like, and especially designed to be used in connection with a motor for driving it.

More specifically it is my object to provide a cream whipper of this class, in which the several working parts may be readily, quickly and easily detached from each other and from the motor shaft for purposes of cleaning, and after cleaning may be reassembled quickly and easily and without the use of tools.

My invention consists in the construction, arrangement and combination of the various parts of the cream whipper, whereby the objects contemplated are attained, as hereinafter more fully set forth, pointed out in my claim, and illustrated in the accompanying drawings, in which:

Figure 1 shows a vertical, central sectional view through a cream whipper embodying my invention, and detached from the motor, taken on the line 1—1 of Figure 2; and Figure 2 shows a top or plan view of the same with the motor applied.

Referring to the accompanying drawings, I have used the reference numeral 10 to indicate the base. Mounted upon this base are two retaining guide members 11. The cream receptacle is indicated generally by the numeral 12, and it has at its bottom two outwardly extended flanges 13, designed to slidingly enter the guides 11 and to be retained by said guides in a fixed position when assembled. The receptacle 12 has a curved bottom 14 and a detachable cover 15, and is preferably rectangular in horizontal section. On one side of the receptacle is a cylindrical bearing 16, closed at its outer side, and at the other side is a cylindrical bearing 17, the opening of which extends through the bearing.

The dasher comprises a central tubular shaft 18, its total length being less than the width of the interior of the receptacle 12. Mounted upon the end portions of this shaft 18 are the discs 19, and extended across the peripheries of the discs are the beater wires 20. One end of the shaft 18 projects beyond and through the adjacent disc 19, and the other end of the tubular shaft 18 is substantially flush with the other disc 19, and it is also provided with a slotted keyway 21 leading from its end inwardly.

The other bearing for the rotary beater comprises a shaft member 22 having a slot 23 at its outer end, and an annular shoulder 24 to engage the end of the bearing 17. This shaft has a reduced bearing portion at 25 to extend through the bearing 17, and at the end of the bearing portion 25 is another annular shoulder 26, and beyond this shoulder 26 is a reduced portion or stem 27 having a key pin 28. The part 27 is designed to enter the tubular shaft 18, and the key 28 is designed to enter the slot 21. This shaft portion is capable of free longitudinal movement away from the adjacent side of the receptacle 12, and when this is done the beater may be moved laterally within the receptacle 12 a short distance until it is clear from the beater 16, when it may be elevated out of the receptacle 12.

In reassembling after cleaning, the beater device is first placed in position with its tubular shaft in the bearing 16, and then the shaft member is inserted through the bearing 17 and into the other end of the tubular shaft, where it will be securely held against all movements except straight outwardly from the receptacle 12. Then the receptacle is slid in its guides to position with the shaft section 22 on the line with the shaft section 33 thus coupling the two shafts together so that they will slide in unison and at the same time hold the shaft 22 against outward movement.

For driving the shaft member 22, I preferably use a small electric motor 29, having a small pulley 30 on its shaft, connected by a belt 31 with a large pulley 32. This large pulley 32 is fixed on a shaft 33 mounted upon a suitable support 34. The end of the shaft 33 which projects through the support 34 is preferably provided with a fixed ring 35 to prevent longitudinal movement of the shaft in one direction, and also with an angular projection 36 to enter the slot 23, and I also preferably provide a collar 37 slidingly mounted upon the shaft 24, which may be moved to position to overlie the joint between the shaft members 33 and 22 to thereby positively hold the two shaft members in alignment. I have found, however, in practical use, that it is not always necessary to employ the collar 37, as the shafts stay in alignment sufficiently well for ordinary purposes.

In practical use the cream or other material to be whipped or stirred is placed in the receptacle and the motor is started.

After the cream has been whipped, and it is desired to prepare the device for another quantity or other material, the operator simply slides the collar 37 away from the joint between the two shafts, then moves the receptacle in its guides forwardly beyond the shaft section 33 and then grasps the shaft section 22 and draws it straight outwardly away from the receptacle 12. After this has been done the beater member is then loose within the receptacle, and may be grasped and removed. Then the beater member and the receptacle may be cleaned in any ordinary way, and reassembled very quickly and easily and without tools.

I claim as my invention:

An improved cream whipper comprising in combination a base, a standard fixed in position on the base, a driving shaft rotatively mounted upon the standard, guides fixed to the base and extended at right angles to the driving shaft, a cream whipper body slidingly mounted in the said guides and capable of movement lengthwise of the guides, and also capable of being detached from the base when moved beyond the ends of the guides, a cream whipper device within the receptacle and formed with a shaft, said receptacle being formed at one side with a bearing to receive one end of the shaft of the whipper device and the other end of the shaft of the whipper device being formed with a key way, a detachable shaft section having its bearings in one side of the receptacle and being extended through the receptacle and being provided with a key to enter the key way of the whipper, and also being formed with a shoulder to limit its movement inwardly, the outer end of said detachable shaft and the adjacent end of the driving shaft being formed with coacting projections and slots so arranged that when the two are in alinement they will rotate in unison, and also so arranged that when said projections and slots are substantially horizontal, the receptacle may be removed by simply sliding it in its guides, substantially as and for the purposes stated.

Des Moines, Iowa, June 9, 1921.

CHRIST ELIOPULOS.